(12) United States Patent
Factor et al.

(10) Patent No.: US 8,258,998 B2
(45) Date of Patent: Sep. 4, 2012

(54) DEVICE, SYSTEM AND METHOD OF PROTECTING AIRCRAFTS AGAINST INCOMING THREATS

(75) Inventors: Ronen Factor, Ramat Gan (IL); David Dragucki, Herzeliya (IL); Ariye Yehuda Caplan, Haifa (IL); Zahi Ben Ari, Haniel (IL); Semion Zelikman, Rishon Lezion (IL); Colin Henry Hamilton, Blaustein (DE); George Weiss, Kipfenberg (DE); Erwin Franz Keller, Oberhaching (DE); Erhard Seibt, Otterfing (DE)

(73) Assignees: BIRD Aerosystems Limited, Herzelia (IL); EADS Deutschland GmbH, Ottobrunn (DE)

( * ) Notice: Subject to any disclaimer, the term of this patent is extended or adjusted under 35 U.S.C. 154(b) by 316 days.

(21) Appl. No.: 12/659,350

(22) Filed: Mar. 4, 2010

(65) Prior Publication Data

US 2010/0253567 A1 Oct. 7, 2010

(30) Foreign Application Priority Data

Mar. 10, 2009 (IL) .......................... 197522

(51) Int. Cl.
*G01S 13/86* (2006.01)
*G01S 7/38* (2006.01)

(52) U.S. Cl. ................ 342/52; 342/53; 342/54; 342/62; 342/12; 342/13; 342/14; 342/15

(58) Field of Classification Search .............. 342/12–19, 342/52–54, 62
See application file for complete search history.

(56) References Cited

U.S. PATENT DOCUMENTS

| | | | | |
|---|---|---|---|---|
| 5,122,801 A | * | 6/1992 | Hughes | 342/13 |
| 5,136,295 A | * | 8/1992 | Bull et al. | 342/15 |
| 5,574,458 A | * | 11/1996 | Tran | 342/13 |
| 5,662,291 A | * | 9/1997 | Sepp et al. | 244/3.13 |
| 6,055,909 A | * | 5/2000 | Sweeny | 102/336 |
| 6,231,002 B1 | * | 5/2001 | Hibma et al. | 244/3.22 |
| 6,738,012 B1 | * | 5/2004 | Kirkpatrick | 342/67 |
| 6,980,151 B1 | * | 12/2005 | Mohan | 342/13 |
| 6,980,152 B2 | * | 12/2005 | Steadman et al. | 342/14 |
| 7,425,916 B2 | * | 9/2008 | Stevens, Jr. | 342/13 |
| 7,495,198 B2 | * | 2/2009 | Ari | 244/3.1 |
| 7,551,121 B1 | * | 6/2009 | O'Connell et al. | 342/54 |
| 7,688,247 B2 | * | 3/2010 | Anschel et al. | 342/14 |
| 7,709,772 B1 | * | 5/2010 | Patel et al. | 244/3.25 |
| 2005/0062638 A1 | * | 3/2005 | Zeineh | 342/13 |
| 2006/0060691 A1 | * | 3/2006 | Burns | 244/1 TD |
| 2008/0017752 A1 | * | 1/2008 | Shukrun | 244/3.16 |
| 2008/0111728 A1 | | 5/2008 | Stevens | |
| 2010/0253567 A1 | * | 10/2010 | Factor et al. | 342/52 |
| 2010/0283655 A1 | * | 11/2010 | Dunn et al. | 342/12 |
| 2010/0288877 A1 | * | 11/2010 | Strabala | 244/1 TD |

FOREIGN PATENT DOCUMENTS

| | | | |
|---|---|---|---|
| EP | 2239595 A2 | * | 10/2010 |
| GB | 2342983 | | 4/2000 |
| WO | WO 94/11750 | | 5/1994 |

* cited by examiner

*Primary Examiner* — John B Sotomayor
(74) *Attorney, Agent, or Firm* — Eitan, Mehulal & Sadot

(57) ABSTRACT

Device, system and method of protecting aircrafts against incoming threats. For example, a system for protecting an aircraft against an incoming threat includes: one or more electro-optic sensors to substantially continuously search for the incoming threat, and to generate a signal indicating that a possible incoming threat is detected; one or more radar sensors to be activated in response to the signal, and to search for the incoming threat; and a central computer to determine whether or not the incoming threat exists, based on a sensor fusion algorithm able to fuse data received from the one or more electro-optic sensors and data received from the one or more radar sensors.

25 Claims, 3 Drawing Sheets

DEVICE, SYSTEM AND METHOD OF PROTECTING AIRCRAFTS AGAINST INCOMING THREATS

PRIOR APPLICATION DATA

This application claims priority and benefit from Israeli Patent Application Number 197522, titled "Device, System and Method of Protecting Aircrafts Against Incoming Threats", which was filed in the Israeli Patent Office on Mar. 10, 2009, and which is hereby incorporated by reference in its entirety.

FIELD

Some embodiments are related to the field of protecting aircrafts against incoming threats.

BACKGROUND

Military and civilian aircrafts, including fixed-wing aircrafts and rotary-wing aircrafts, may be exposed to threats by hostile forces, for example, terrorists or military forces. In the past three decades, numerous aircrafts have been downed by InfraRed (IR) guided missiles, for example, short-range man-portable shoulder-fired IR guided missiles.

Some aircrafts may be equipped with a Wide-body Integrated Platform Protection System (WIPPS), for example, a WIPPS InfraRed Counter Measures (IRCM) suite. Such systems include, for example, imaging Ultra-Violet (UV) electro-optic Missile Warning Sensors (MWS) and a pulse-Doppler radar MWS, for sensing (namely, detecting and tracking) of incoming threats.

Unfortunately, utilization of two different multi-sensor sub-systems makes the system heavy and prohibitively expensive, particularly for smaller aircraft. Additionally, the use of a second MWS (e.g., constantly active radar system) results in continuous electro-magnetic emissions from the aircraft.

SUMMARY

Some embodiments include, for example, devices, systems, and methods of protecting aircrafts against incoming threats.

In some embodiments, for example, a system for protecting an aircraft against an incoming threat includes: one or more electro-optic sensors to substantially continuously search for the incoming threat, and to generate a signal indicating that a possible incoming threat is detected; one or more radar sensors to be activated in response to the signal, and to confirm the incoming threat; and a central computer to determine whether or not the incoming threat exists, based on a sensor fusion algorithm able to fuse data received from the one or more electro-optic sensors and data received from the one or more radar sensors.

In some embodiments, for example, the one or more electro-optic sensors include one or more wide-angle panoramic electro-optic sensors able to produce and process images.

In some embodiments, for example, the one or more radar sensors include one or more gimbaled slew radar sensors.

In some embodiments, for example, the one or more radar sensors include one or more narrow-beam Ka Band radar sensors.

In some embodiments, for example, the one or more radar sensors is to maintain a non-transmitting standby mode until receiving the signal, and to switch from the standby mode to an active transmitting mode upon receiving the signal.

In some embodiments, for example, the one or more radar sensors utilize a radar waveform constructed based on an initial range between the aircraft and the incoming threat.

In some embodiments, for example, the central computer is to calculate the initial range using Digital Terrain Model (DTM) data.

In some embodiments, for example, one or more operational parameters of the one or more radar sensors are configured based on the constructed radar waveform.

In some embodiments, for example, the initial range is calculated based on data provided by the one or more electro-optic sensors and data provided by a navigation system of the aircraft.

In some embodiments, for example, the data provided by the navigation system of the aircraft includes at least one of: aircraft angular position; aircraft angular velocity; and aircraft altitude.

In some embodiments, for example, the one or more radar sensors are associated with a gimbaling mechanism having one or more gimbals; and the gimbaling mechanism is to set an initial orientation of the one or more gimbals based on the data provided by the navigation system of the aircraft.

In some embodiments, for example, the one or more electro-optic sensors is operational during flight for a time period which is at least ten times greater than the time period in which the one or more radar sensors are operational.

In some embodiments, for example, if the central computer determines, based on the sensor fusion algorithm, that the possible incoming threat does not exist, and a maximum duration of the possible incoming threat is not reached, then the one or more radar sensors are to perform one or more additional threat confirmation cycles.

In some embodiments, for example, the central computer is to selectively activate one or more airborne countermeasure devices upon determination that the incoming threat exists.

In some embodiments, for example, the airborne countermeasure devices include at least one of: a decoy dispenser, a chaff dispenser, and a flare dispenser.

In some embodiments, for example, the system includes a radome to cover at least partially the one or more radar sensors.

In some embodiments, for example, the system is mounted on at least one of: a bottom portion of the aircraft; a side portion of the aircraft; and a top portion of the aircraft.

In some embodiments, for example, the aircraft includes an aircraft selected from the group consisting of: an airplane, a helicopter, a manned aircraft, an unmanned aircraft, a military aircraft, a civilian aircraft, a commercial aircraft, an executive aircraft, and a cargo aircraft.

In some embodiments, for example, a method for protecting an aircraft against an incoming threat includes: substantially continuously searching for the incoming threat using one or more electro-optic sensors; generating, by the one or more electro-optic sensors, a signal indicating that a possible incoming threat is detected; in response to the signal, activating one or more radar sensors to search for the incoming threat; and determining whether or not the incoming threat exists, based on a sensor fusion algorithm able to fuse data received from the one or more electro-optic sensors and data received from the one or more radar sensors.

In some embodiments, for example, the method includes: maintaining, by the one or more radar sensors, a non-transmitting standby mode until receiving the signal; and switching from the standby mode to an active transmitting mode upon receiving the signal.

In some embodiments, for example, the method includes: constructing a radar waveform, for utilization by the one or more radar sensors, based on an initial range between the aircraft and the incoming threat.

In some embodiments, for example, the method includes: calculating the initial range using Digital Terrain Model (DTM) data.

In some embodiments, for example, the method includes: configuring one or more operational parameters of the one or more radar sensors based on the constructed radar waveform.

In some embodiments, for example, the method includes: calculating the initial range based on data provided by the one or more electro-optic sensors and data provided by a navigation system of the aircraft.

In some embodiments, for example, the method includes: based on the sensor fusion algorithm, determining that the possible incoming threat does not exist and that a maximum duration of the possible incoming threat is not reached; and performing by the one or more radar sensors one or more additional threat confirmation cycles.

In some embodiments, for example, the method includes: selectively activating one or more airborne countermeasure devices upon determination that the incoming threat exists.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
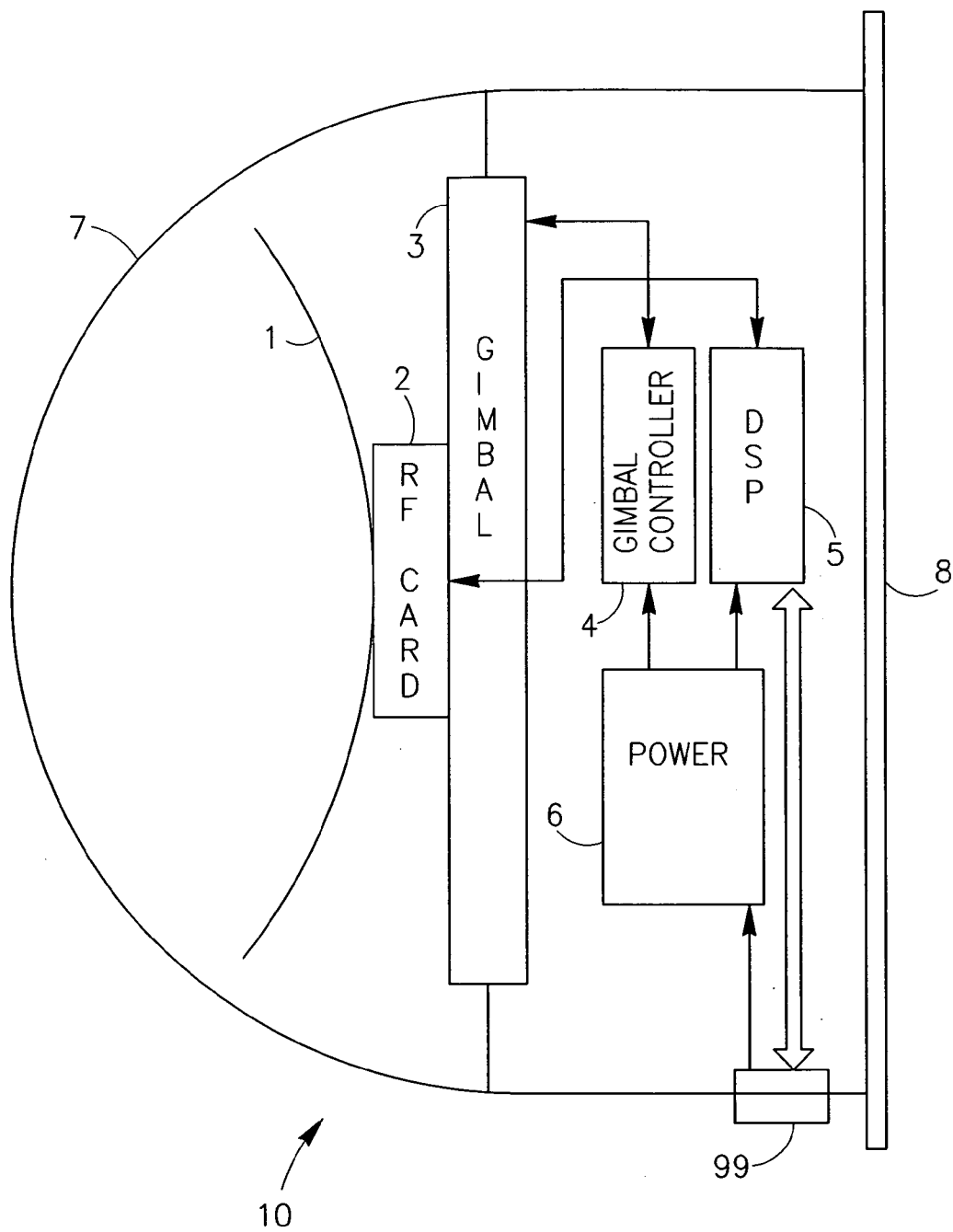
FIG. 1 is a schematic block diagram illustration of a Missile Approach Confirmation Sensor (MACS) system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The term "aircraft" as used herein includes, for example, an airborne platform or object or vehicle; a vehicle or object which is able to fly through the air or through an atmosphere of a planet; a vehicle or object which is able to sustain itself above the ground; an airplane; a helicopter; a manned aircraft; an unmanned aircraft; a Remotely Piloted Vehicle (RPV); an Unmanned Aerial Vehicle (UAV); a fixed-wing aircraft; a rotorcraft or rotary-wing aircraft; an autogyro or gyroplane; a powered aircraft; an unpowered aircraft (e.g., a glider, a paraglider, a balloon, a kite); an aircraft having one or more propellers; a jet propulsion aircraft; a military aircraft (e.g., a fighter, a bomber, a fighter-bomber, a ground-attack aircraft, an attack helicopter); a civilian aircraft (e.g., commercial, executive, cargo); a rocket; a missile; a rocket-powered aircraft; or the like.

Although portions of the discussion herein relate, for demonstrative purposes, to a helicopter and to components thereof, some embodiments may be used in conjunction with other types of aircrafts.

The terms "aircraft" or "protected aircraft" as used herein may relate to an aircraft which is being protected or is intended to be protected against incoming threats; or an aircraft on which a self-protective system, in accordance with some embodiments, is installed or mounted.

The terms "threat", "incoming threat", "airborne threat", "airborne target", or "target", as used herein include, for example, a missile, a rocket, a bomb, a self-propelled projectile, an airborne missile, an airborne object directed towards a protected aircraft, a missile having an engine and/or a warhead, a cruise missile, a guided missile, or the like.

The term "Ka Band" as used herein includes, for example, a range of frequencies of the electromagnetic spectrum from approximately 26.5 GHz to approximately 40 GHz.

At an overview, some embodiments include devices, systems, and methods of protecting aircrafts against incoming threats. In particular, some embodiments include one or more Missile Approach Confirmation Sensors (MACS) for self-protection systems of aircrafts, which may be used as an airborne self-protective system, in conjunction with one or more airborne countermeasure devices (e.g., decoy, chaff or flare dispenser).

In some embodiments, a missile warning system for an aircraft includes: a wide-angle electro-optic sensor, that continuously monitors the airspace for incoming threats (e.g., airborne missiles); and a narrow-angle electromagnetic sensor (radar sensor), optionally operable in the Ka Band. The radar sensor is activated only when the electro-optic sensor detects a possible incoming threat. At the activation of the radar sensor, the radar sensor receives from the central computer an approximate location or direction of the incoming threat that is calculated based on the data from the electromagnetic sensor and the inertial measurement unit, adjusts its position or orientation towards it; and performs one or more cycles to verify the possible detection. A central computer declares a valid threat based on a sensor fusion analysis which takes into account the data received from the two types of sensors, namely, the electro-optic sensor and the radar sensor. One or more countermeasure devices (e.g., decoy, chaff or flare dispensers) may be automatically activated or launched in response to a valid threat detection.

In some embodiments, a target sensing system for protecting an aircraft includes multiple sensor devices, for example, wide-angle body-fixed image-producing and processing passive panoramic electro-optic sensors. The sensors may further allow sensor fusion with a gimbaled stewed radar sensor, thereby providing missile approach confirmation data (e.g., in contrast with tracking radar, which may have to operate in stand-alone mode). The aircraft may be equipped with more than one radar sensor, for providing better angular coverage. The MACS output may include, for example, the speed of the incoming threat, and the range or distance between the protected aircraft and incoming threat.

In some embodiments, the integrated installation and/or calibration of both the electro-optic sensors and the radar sensor(s), may reduce the width of the radar antenna effective beam (e.g., to as low as one pixel angular resolution value of the passive panoramic sensor).

In some embodiments, the slewing may be facilitated by data received from other systems of the protected aircraft, for example, aircraft angular position, aircraft angular velocity, and/or aircraft altitude. Such data may facilitate providing a favorable initial orientation of the gimbals bearing the narrow-angle-sensor, for example, to minimize rotation time and to improve slewing accuracy and stability, and thereby further reducing the required beam angle, as well as the weight and/or cost of the system.

In some embodiments, the transmitted waveform may be programmed according to the target range which may be calculated using the angular data from the electro-optic sensors, the current position of the aircraft, and Digital Terrain Model (DTM) data which may be preloaded to the system. Utilization of a custom-designed waveform may, for example, increase the maximum detection range of the radar sensor, and may thereby increase the probability of target detection, as well as decrease the probability for false alarms.

In some embodiments, the MACS system utilizes an operating wavelength in the millimeter-waves band (Ka Band), such as to not interfere with other airborne and ground radiating sources such as radars.

In some embodiments, the radar sensor is operated for a relatively very short time, thereby reducing possible interference with other systems. For example, the radar sensor is substantially idle, substantially continuously all along the operation time of the MACS system, except for the final phase of target sensing mission, after the body-fix panoramic sensor already detected the incoming threat and it is required to confirm missile approach.

FIG. 1 is a schematic block diagram illustration of a MACS system 10 which may be mounted on an aircraft, in accordance with some demonstrative embodiments.

The MACS system 10 includes a narrow-band antenna 1 operating at Ka Band frequency. The antenna 1 transmits an electro-magnetic signal that is being generated, up-converted to Ka Band frequency, and amplified by a Radio-Frequency (RF) card 2. The RF card may be located, for example, at the backplane of the antenna 1, to allow improved cooling and/or to reduce power loss between these elements. The antenna 1 is capable of moving along two axes using a gimbal mechanism 3 which includes, for example, two motors driven by a gimbals electronic controller card 4.

The electro-magnetic signal is received by antenna 1, amplified and down-converted by the RF card 2, and sent to a digital signal processing card 5 for target detection. The digital signal processing card 5 analyzes the received frequency spectrum, in order to detect and track the signal returned from the target, from noise and other types of signals which may be received but are not of interest to the MACS system 10.

The MACS system 10 further includes a power supply 6, for example, a DC/DC power supply able to provide voltage to the RF card 2, to the gimbals electronic control card 4, and the digital signal processing card 5. The power supply 6 may include suitable voltage converter circuits and filter circuits, for example, for cleaning and/or stabilizing the input voltage received from the aircraft. The power supply 6 may optionally include, or may be associated with, a power controller, which may be able to switch one or more sensors of the aircraft (e.g., radar sensors) from "operational" mode into "standby" mode, and vice versa.

In some embodiments, an interface 99 may be used between the MACS system 10 and other systems of the aircraft. For example, the power supply 6 of the MACS system 10 may receive power through the interface 99 from another sub-system of the aircraft. Similarly, the interface 99 may allow the digital signal processing card 5 to communicate with other processors or data storage units of the aircraft.

The MACS system may be mounted or installed on the aircraft body 8, for example, under the "belly" or bottom portion of the aircraft, on top of the fuselage of aircraft, or on a side of the aircraft. In some embodiments, the MACS system may be covered by a radome 7, made from composite materials to reduce power loss and aircraft aerodynamic drag due to MACS sensors installation.

Figure 2:
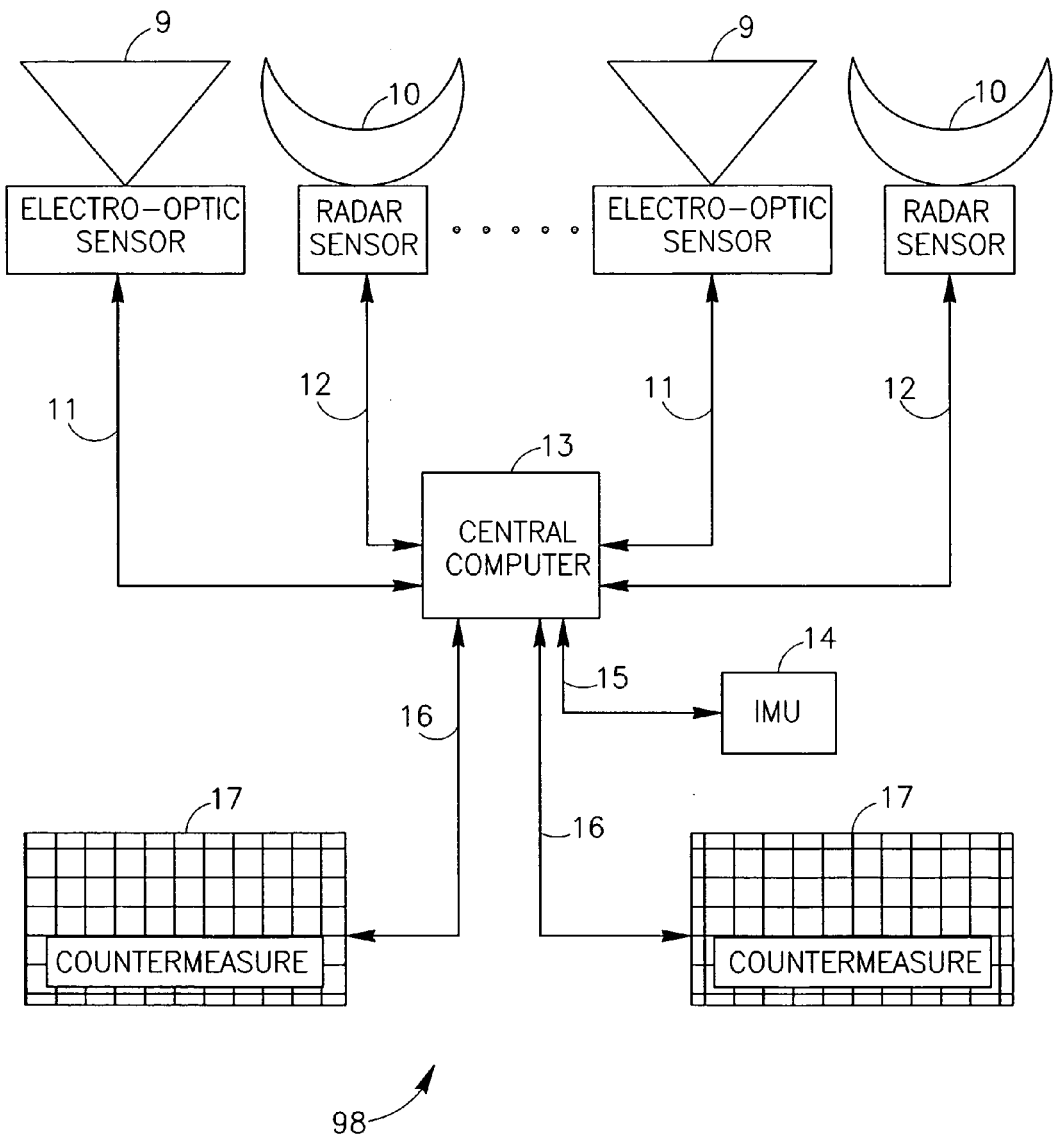
FIG. 2 is a schematic block diagram illustration of a combined airborne missile protection system, in accordance with some demonstrative embodiments.

FIG. 2 is a schematic block diagram illustration of a combined airborne missile protection system 98, in accordance with some embodiments. System 98 includes one or more wide angle view electro-optic sensors 9, as well as one or more narrow beam radar sensors 10. The number of electro-optic sensors 9 and/or radar sensors 10 may be set in accordance with specific implementation requirements, for example, based on the required angular coverage around the protected aircraft. For demonstrative purposes, two electro optic sensors 9 are shown, and two radar sensors 10 are shown; other suitable numbers may be used.

Each electro-optic sensor 9 may include, for example, a panoramic sensor with a high level of angular measuring accuracy, to allow angular detection of the respective missile to be defended against, for example, by detecting the launch flash or the propulsion unit radiation of that missile. The electro-optic sensor(s) 9 may include image-producing and processing electro-optic sensor devices, which operate for incoming threat detection as well as for sensor fusion with the radar sensor(s) for clear close-range detection.

The electro-optic sensors 9 and the radar sensors 10 are connected through electrical cables 11 and 12, respectively, to a central computer 13. A suitable communication protocol may be used for communications among components of system 98, for example, Ethernet, RS-422, RS-485, Controller Area Network (CAN or CAN-bus), FlexRay, or the like.

The electro-optic sensor(s) 9 receive, substantially continuously, navigation data streaming from an Inertial Measurement Unit (IMU) 14 via the central computer 13 using a communication channel 15. The navigation data includes, for example, aircraft angles, aircraft altitude, aircraft velocity, aircraft position, and other navigation information.

Once the electro-optic sensor(s) 9 initially detect a source of Ultra Violet (UV) radiation that is approaching the aircraft, azimuth and elevation angles of the approaching target are calculated, relatively to the aircraft; and are sent to the radar sensor(s) 10 via the central computer 13 after being corrected to take into consideration the movement of the aircraft.

The radar sensor 10 moves to the direction of the target, and starts to transmit and receive electro-magnetic signals on Ka Band central frequency, in order to detect and track the approaching target and measure its Doppler speed and distance. If a valid target track is created by the radar sensor(s) 10, the data is sent to the central computer 13. Then, the central computer 13 executes an algorithm for data fusion and target confirmation.

If a valid target is confirmed, one or more countermeasure units 17 are activated by the central computer 13, using a communication channel 16. The countermeasure units 17 may include, for example, a chaff or flare dispenser, a Directional InfraRed Countermeasure (DIRCM) device, a Large InfraRed Countermeasure device (LIRCM), or other type of countermeasure devices which may be effective against the incoming threat, e.g., against a man-portable IR homing anti-aircraft missile or other Man-Portable Air-Defense (MANPAD) systems. The countermeasure unit(s) 17 may be activated for a period of time, or for a number of attempts, as set by the central computer 13.

Figure 3:
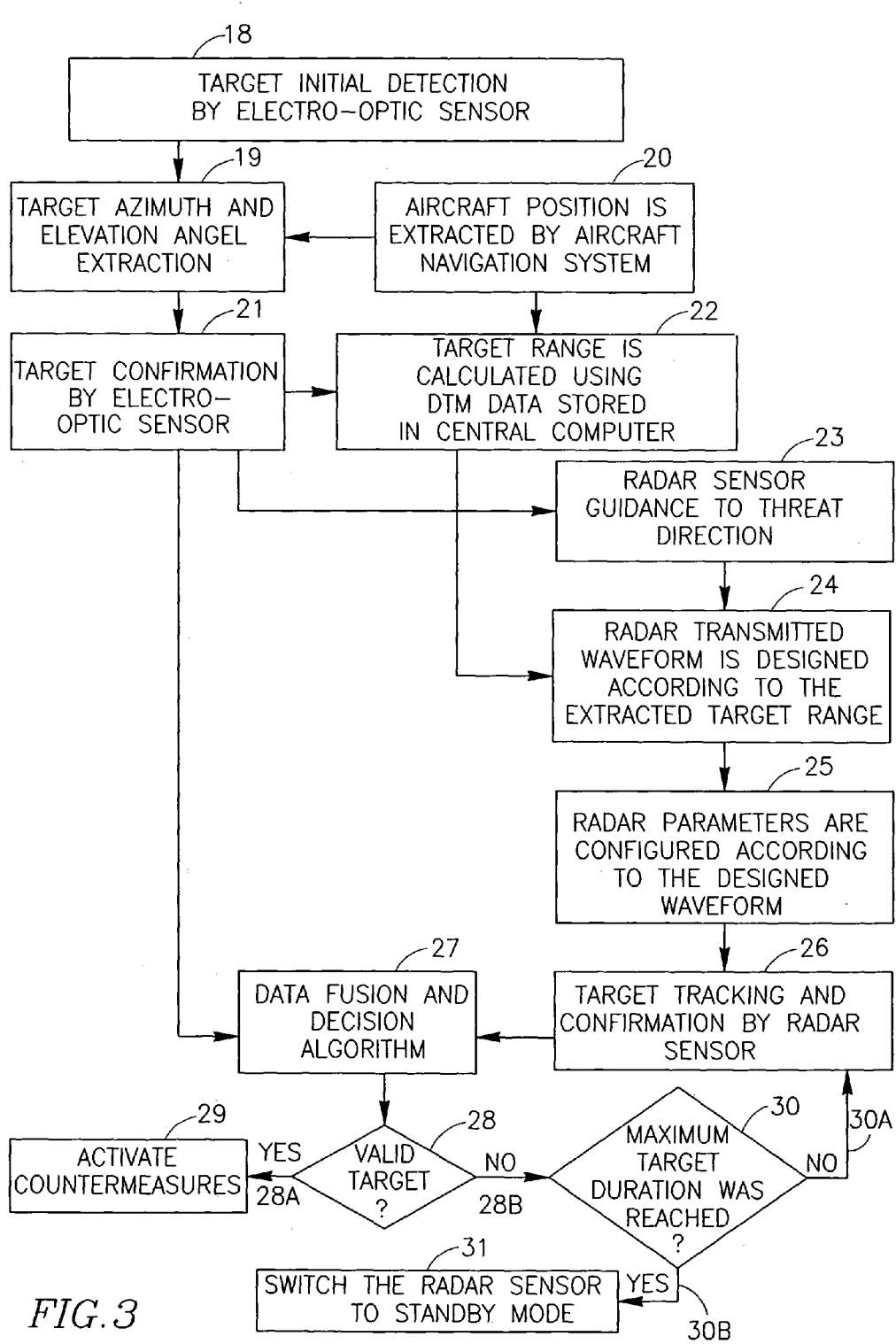
FIG. 3 is a schematic flow-chart of a method of sensing an airborne threat approaching a protected aircraft, in accordance with some demonstrative embodiments.

FIG. 3 is a schematic flow-chart of a method of sensing an airborne threat approaching a protected aircraft, in accordance with some demonstrative embodiments. The method may be implemented, for example, using components and/or systems of FIG. 1 and/or FIG. 2.

The method may be initiated upon initial detection of the target (block 18), for example, by one of the electro-optic sensors 9 of FIG. 1 which are installed on the aircraft. Once the initial detection is declared, extraction of the target azimuth and elevation angles is performed (block 19), for example, using aircraft position data provided by the aircraft navigation system (block 20).

Then, target confirmation is performed by the electro-optic sensor (block 21). For example, the initial range of the target is calculated using the target azimuth and elevation angles data (from block 19), the aircraft current position (from block 20), and Digital Terrain Model (DTM) data which may be stored in the central computer (block 22).

Once the target confirmation is done by the electro-optic sensor (block 21), the radar sensor is guided to the direction of the target (block 23). The initial range of the target (from block 22) is used in order to design a radar transmitted waveform (block 24), which may be suitable or substantially optimal for the extracted range. Radar parameters configuration is performed (block 25) for the designed radar waveform. Then, the radar sensor is activated, after the configuration of the radar parameters (block 25) and the design of the optimal radar waveform (block 24). In case of target existence, a target tracking and confirmation cycle is performed by the radar sensor (block 26)

During the radar confirmation and tracking, the electro-optic sensor continues to perform target confirmation (block 21). Once the radar sensor and the electro-optic sensor complete one or more confirmation cycles, they send the data to the central computer, which executes a data fusion and detection algorithm (block 27). The algorithm may be based, for example, on various statistical calculations for better probability of detection and to minimize false alarms.

The method proceeds by checking whether or not a valid target decision was declared by the data fusion and confirmation algorithm (block 28). If a valid target decision was declared by the data fusion and detection algorithm (arrow 28A), then one or more countermeasures are activated (block 29), optionally utilizing a pre-defined countermeasure algorithm.

In contrast, if a valid target decision was not declared by the data fusion and confirmation algorithm (arrow 28B), the method may proceed by checking whether or not a maximum target duration time was reached (block 30).

If the maximum target duration time was not reached (arrow 30A), another confirmation and tracking cycle (or multiple cycles) may be performed by the radar sensor (block 26), in order to perform again the data fusion and target confirmation algorithm. In contrast, if a valid target decision was not declared and the maximum target duration time was reached (arrow 30B), then the radar sensor stops to transmits electromagnetic signals and goes into stand-by mode (block 31).

Other suitable operations or sets of operations may be used.

Some embodiments may thus provide an airborne missile warning system which includes both electro-optic sensor(s) and radar sensor(s), thereby significantly reducing false alarm rates (e.g., to one per a few thousands of flight hours) along with increasing probability of detection. The system may be light enough to be installed on lighter aircrafts, for example, helicopters or executive airplanes, and may be implemented at a relatively low or affordable price. In some embodiments, the selected frequency band may be in accordance with the Federal Aviation Administration (FAA) or the Joint Aviation Authorities (JAA) requirements for system certification.

In some embodiments, the passive state of the system during most of the flight time (e.g., since the electro-optic sensor is active, by the radar sensor is inactive), may avoid or minimize the detection, localization and/or tracking of the aircraft by electronic support measure systems; and may further eliminate hazards which may be caused by the system as a result of interference to other important systems operating in a similar frequency range, such as Air Traffic Control (ATC) systems.

Some embodiments may be used in conjunction with "soft-kill" countermeasures that operate to mislead an incoming missile, e.g., a decoy; and may not necessarily require activating "hard-kill" countermeasures which operate to destroy the threat or physically defeat the threat. For example, an anti-aircraft IR homing missile may be fired towards an aircraft, and may have a rocket motor which burns throughout its flight. A soft-kill system, for example, chaff or flare dispensers, may be installed on the aircraft in fixed positions, and may not require a gimbal mechanism or other pivoting or directing mechanism. Accordingly, a low-weight radar sensor may be gimbaled by itself, using a smaller, low-weight gimbal system. Additionally, since the UV signature of the anti-aircraft IR homing missile is available throughout most of its flight-time, a passive panoramic system may handle the target throughout the flight-time and may continuously support another type of sensor, for example, the radar sensor, with continuous fusion between the two types of sensors. Therefore, in some embodiments, there is no requirement for stand-alone operation for the radar sensor to be installed in addition to the passive panoramic sensor.

In some embodiments, short range detection may not be compatible with a narrow beam antenna, for example, because the product of range and beam-width may result in an unacceptably low tracking spot. A relatively wide beam, which is used by a tracking radar in a ground vehicle, may shorten the maximum radar working range due to power budget constraints. In contrast, some embodiments utilize a narrow beam radar sensor, and may accommodate long range detection of incoming threats to the aircraft. Additionally, at short ranges, the time-line dictates a one-time decision of firing the counter-measures; whereas at long ranges, a target-verification by an additional radar sensor may be attempted at least once, and then repeated once or several times as necessary. Furthermore, in contrast with protection of ground vehicles, a small aircraft may be associated with weight and/or power constraints; and narrow-beam, low weight, low-power radar sensor is feasible operating at the ranges that still allow effective countermeasure deployment.

Some embodiment may accommodate strict certification requirements for airborne systems, in order to avoid or minimize interference with other radar air, ground and naval based systems, and in order to safeguard operation with a low False-Alarm Rate (FAR), while not reducing the probability of threat detection. In accordance with some embodiments, a narrow-angle, low total power-output sensor may meet such requirements. Dynamically adaptive digital processing algorithms may reduce the radar FAR, while increasing the probability of threat detection. Additionally, with multiple-decision logic, FAR requirements may be accommodated more easily. Furthermore, airborne utilization of specific millimeter-waves band (Ka Band) may be more accommodating to meet FAA requirements or other certification requirements.

In some embodiments, additional requirements may be used with regard to the maximum range of the radar in order to maximize the probability of detection of an incoming missile. Extension of the radar range may be achieved, for example, by calculation of the missile range using the aircraft and electro-optic sensor parameters and calibration of the radar sensor parameters accordingly.

Some embodiments may thus provide a missile warning system for a protected aircraft, the system including: one or more Ka Band lightweight and compact radar sensors (which may be implemented at a relatively low price); and one or more electro-optic sensors. The sensors are able to communicate with a central computer, a navigation data measurement unit, and one or more countermeasure devices. The system may be installed even on light types of aircraft, airplanes and helicopters.

Some embodiments may utilize a data fusion algorithm which integrates the data from two types of sensors (namely, the one or more electro-optic sensors, and the one or more radar sensors), in order to significantly reduce the system False Alarm Rate (FAR) to improve the probability of target detection. The reduced FAR may further allow obtaining of FAA/JAA certification for such missile warning system, and installation of such system on civilian aircrafts.

Some embodiments utilize a method of integration among different types of countermeasure devices, with different types of sensors, into the missile warning system, in order to provide maximum survivability for the aircraft under attack of various kinds of threats, including MANPADs.

Some embodiments utilize a method of extending the radar sensor's maximum detected range, for example, by construction of the radar waveform according to the initial range between the protected aircraft and the target (namely, the incoming missile), which is calculated using data provided by the electro-optic sensors and the aircraft navigation system. Additionally, a method may be used for adaptation of the radar sensor parameters accordingly to the radar waveform which is constructed as described, for example, in order to increase the probability of detection and to reduce the FAR.

Some embodiments may provide a mode of operation which substantially avoids, or significantly reduces, the detection, localization and/or tracking of the protected aircraft having the installed missile warning system by electronic support measure systems. This is achieved, for example, since the radar sensor transmits an electro-magnetic signal for short periods of time, using a narrow beamwidth antenna, and only a few times per flight. The number of activation times of the radar sensor may depend (e.g., mostly) on the electro-optic FAR, which may be significantly low.

In some embodiments, for example, the electro-optic sensors may be activated and operational, during flight, for a time period which may be significantly greater (e.g., 10 times greater, 100 times greater, 500 times greater, or the like) than the time period for which the radar sensors are activated and operational. For example, most of the time, the electro-optic sensors may be activated and operational, while the radar sensors may be inactive or in "standby" mode; whereas only for short period of times, upon detection of a possible incoming threat by the electro-optic sensors, the radar sensor is switched from "standby" mode into operational mode for one or more cycles of detection, or until the central computer determines that the radar sensor may be switched back into "standby" mode (e.g., if the incoming threat does not exist, or terminated to exist).

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may utilize a combination of hardware components and/or software modules, in accordance with specific implementations. Some embodiments may utilize software, hardware, or any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. A system for protecting an aircraft against an incoming threat, the system comprising:
(a) a wide-angle panoramic electro-optic sensor to substantially continuously search for said incoming threat,
the wide-angle panoramic electro-optic sensor able to (i) produce and process images and (ii) detect a non-verified possible incoming threat;
(b) a narrow-band electro-magnetic radar sensor, operable in Ka Band frequencies of approximately 26.5 GHz to approximately 40 GHz, to search for said incoming threat; and
(c) a central computer (A) to activate said narrow-band electro-magnetic radar sensor only upon detection of the possible incoming threat by the wide-angle panoramic electro-optic sensor, and (B) to transfer to said narrow-band electro-magnetic radar sensor data, calculated by the central computer based on input from the wide-angle panoramic electro-optic sensor, the data indicating to the narrow-band electro-magnetic radar sensor to adjust its orientation towards the possible incoming threat;
wherein the narrow-band electro-magnetic radar sensor is to transmit, towards said possible incoming threat, a radar waveform constructed based on an initial range between the aircraft and the possible incoming threat as estimated by the central computer based on input from the wide-angle panoramic electro-optic sensor.

2. The system of claim 1, wherein the narrow-band electro-magnetic radar sensor comprises one or more gimbaled slew radar sensors.

3. The system of claim 1, wherein the central computer is to calculate said initial range using Digital Terrain Model (DTM) data.

4. The system of claim 1 wherein the central computer is to configure one or more operational parameters of the narrow-band electro-magnetic radar sensor based on said constructed radar waveform.

5. The system of claim 1 wherein the central computer is to calculate said initial range based on data provided by the wide-angle panoramic electro-optic sensor and data provided by a navigation system of said aircraft.

6. The system of claim 5, wherein the data provided by said navigation system of the aircraft comprises at least one of: aircraft angular position; aircraft angular velocity; and aircraft altitude.

7. The system of claim 5, wherein the narrow-band electro-magnetic radar sensor is associated with a gimbaling mechanism having one or more gimbals, and wherein the gimbaling mechanism is to set an initial orientation of said one or more gimbals based on the data provided by said navigation system of said aircraft.

8. The system of claim 1, wherein the central computer is to maintain the wide-angle panoramic electro-optic sensor operational during flight for a time period which is at least ten times greater than the time period in which the narrow-band electro-magnetic radar sensor is operational.

9. The system of claim 1, wherein, if the central computer determines, that (A) the possible incoming threat does not exist, and (B) a maximum duration of the possible incoming threat is not reached, then the central computer is to command the narrow-band electro-magnetic radar sensor to perform one or more additional threat confirmation cycles.

10. The system of claim 1, wherein the central computer is to selectively activate one or more airborne countermeasure devices upon determination that said incoming threat exists.

11. The system of claim 10, wherein the airborne countermeasure devices comprise at least one of: a decoy dispenser, a chaff dispenser, and a flare dispenser.

12. The system of claim 1, further comprising a radome to cover at least partially the narrow-band electro-magnetic radar sensor.

13. The system of claim 1, wherein the system is mounted on at least one of:
a bottom portion of said aircraft;
a side portion of said aircraft; and
a top portion of said aircraft.

14. The system of claim 1, wherein the aircraft comprises an aircraft selected from the group consisting of: an airplane, a helicopter, a manned aircraft, an unmanned aircraft, a military aircraft, a civilian aircraft, a commercial aircraft, an executive aircraft, and a cargo aircraft.

15. A method for protecting an aircraft against an incoming threat, the method comprising:
(a) substantially continuously searching for said incoming threat by utilizing a wide-angle panoramic electro-optic; sensor able to (i) produce and process images and (ii) detect a non-verified possible incoming threat;
(b) searching for said incoming threat by utilizing a narrow-band electro-magnetic radar sensor, operable in Ka Band frequencies of approximately 26.5 GHz to approximately 40 GHz;
(c) substantially continuously maintaining the narrow-band electro-magnetic radar sensor in non-transmitting standby mode of not searching for said incoming threat;
(d) activating said narrow-band electro-magnetic radar sensor only upon detection of the possible incoming threat based on a possible detection by the wide-angle panoramic electro-optic sensor;
(e) transferring to said narrow-band electro-magnetic radar sensor data, calculated based on input from the wide-angle panoramic electro-optic sensor, the data indicating to the narrow-band electro-magnetic radar sensor to adjust its orientation towards the possible threat;
(f) transmitting by the narrow-band electro-magnetic radar sensor, towards said possible incoming threat, a radar waveform constructed based on an initial range between the aircraft and the possible incoming threat as estimated based on input from the wide-angle panoramic electro-optic sensor.

16. The method of claim 15, comprising:
calculating said initial range using Digital Terrain Model (DTM) data.

17. The method of claim 15, comprising:
configuring one or more operational parameters of the narrow-band electro-magnetic radar sensor based on said constructed radar waveform.

18. The method of claim 15, comprising:
calculating said initial range based on data provided by the wide-angle panoramic electro-optic sensor and data provided by a navigation system of said aircraft.

19. The method of claim 15, comprising:
based on said sensor fusion algorithm, determining that the possible incoming threat does not exist and that a maximum duration of the possible incoming threat is not reached; and
performing by the narrow-band electro-magnetic radar sensor one or more additional threat confirmation cycles.

20. The method of claim 15, comprising:
selectively activating one or more airborne countermeasure devices upon determination that said incoming threat exists.

21. The method of claim 20, wherein selectively activating the airborne countermeasure devices comprises:
selectively activating at least one of: a decoy dispenser, a chaff dispenser, and a flare dispenser.

22. The method of claim 15, wherein the data provided by said navigation system of the aircraft comprises at least one of: aircraft angular position; aircraft angular velocity; and aircraft altitude.

23. The method of claim 15, wherein the narrow-band electro-magnetic radar sensor is associated with a gimbaling mechanism having one or more gimbals, and wherein the method further comprises:
setting by the gimbaling mechanism an initial orientation of said one or more gimbals based on the data provided by said navigation system of said aircraft.

24. The method of claim 15, comprising:
maintaining the wide-angle panoramic electro-optic sensor operational during flight for a time period which is at least ten times greater than the time period in which the narrow-band electro-magnetic radar sensor is operational.

25. The method of claim 15, further comprising:
determining that (A) the possible incoming threat does not exist, and (B) a maximum duration of the possible incoming threat is not reached; and
by utilizing the narrow-band electro-magnetic radar sensor, performing one or more additional threat confirmation cycles.

* * * * *